United States Patent [19]

Seth

[11] 4,192,090

[45] Mar. 11, 1980

[54] VEHICLE SAFETY LIGHT

[76] Inventor: Marion Seth, 902 E. 17th St., Wilmington, Del. 19802

[21] Appl. No.: 910,613

[22] Filed: May 30, 1978

Related U.S. Application Data

[63] Continuation-in-part of Ser. No. 804,325, Jun. 7, 1977, abandoned.

[51] Int. Cl.² .............................................. G09F 21/04
[52] U.S. Cl. .................................. 40/591; 340/87; 340/107
[58] Field of Search .................... 40/591, 592, 575; 340/87, 107

[56] References Cited

U.S. PATENT DOCUMENTS

| 2,671,423 | 3/1954 | Mead | 40/591 |
|---|---|---|---|
| 2,878,462 | 3/1959 | Tralli | 340/87 |
| 3,242,329 | 3/1966 | Abrams | 40/541 |
| 3,255,725 | 6/1966 | Von Kreidner et al. | 340/87 X |
| 3,274,548 | 9/1966 | Brimsek | 340/107 X |
| 3,800,430 | 4/1974 | Samra | 340/87 |
| 3,864,861 | 2/1975 | Hill | 40/576 |
| 4,054,789 | 10/1977 | Romanelli | 340/87 |
| 4,129,857 | 12/1978 | Espinosa | 340/107 |

*Primary Examiner*—John F. Pitrelli
*Attorney, Agent, or Firm*—Mortenson & Uebler

[57] ABSTRACT

A safety light for disabled vehicles is provided which may be placed in any desired area on or in close proximity to the vehicle. The safety light includes a translucent sign mounted on a frame, and means for lighting the sign including a portable power supply, a connecting wire to vehicle cigarette lighter and the like. The frame includes slots to permit placement of the sign in a hinged bracket attached to the interior surface of an automobile trunk lid. A spring loaded catch on the interior surface of the trunk lid secures the light to the trunk lid when not in use.

3 Claims, 4 Drawing Figures

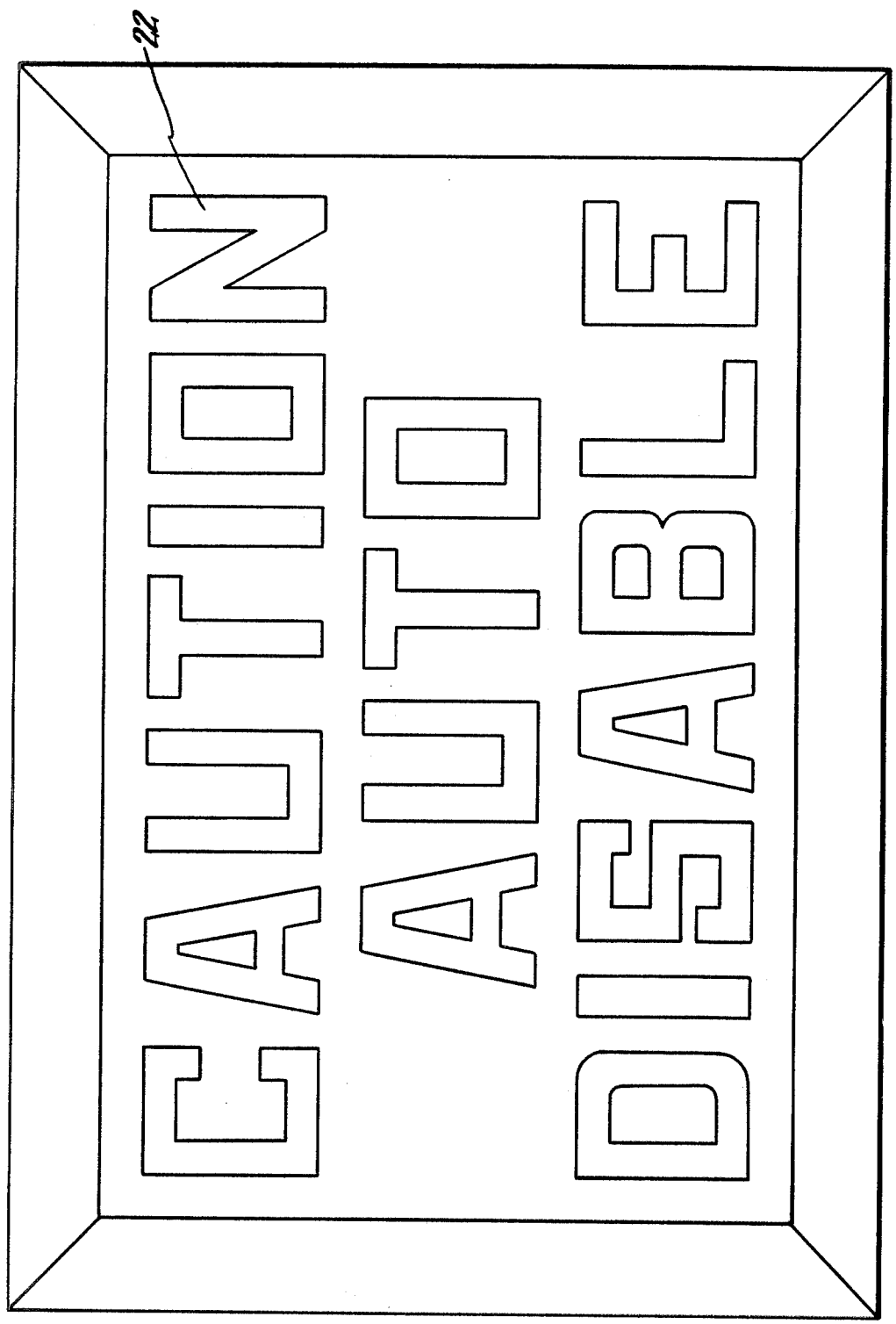

VEHICLE SAFETY LIGHT

CROSS REFERENCES TO RELATED APPLICATIONS

This applications is a continuation-in-part application of my prior copending application Ser. No. 804,325, filed June 7, 1977, and now abandoned upon filing this application.

BACKGROUND OF THE INVENTION

This invention relates to a safety light for use with automotive vehicles.

Frequently an automobile may become disabled in remote areas where assistance may be long in coming or where it is difficult for oncoming motorists to see the disabled automobile. The latter condition creates a serious potential accident condition.

Accordingly, it is desirable to provide a suitable safety light for automotive vehicles. Further, it is desirable to provide such a safety light which can be secured to the vehicle or removed therefrom for placement in any desired area in proximity to the disabled vehicle.

DESCRIPTION OF THE PRIOR ART

U.S. Pat. No. 2,878,462 discloses an auxiliary light for a vehicle detachably secured to the rear of the vehicle and connected to the electrical circuits of the vehicle or to the cigarette lighter outlet.

U.S. Pat. No. 2,671,423 discloses an automobile warning sign which is attached to the inside of the trunk lid, and which automatically displays a warning sign when the trunk lid is raised.

U.S. Pat. No. 3,242,329 discloses an illuminated display device which is removable from the top of a vehicle such as a police car or taxi. This device may thus be removed from the vehicle when it is being used for private purposes.

U.S. Pat. No. 3,864,861 discloses an illuminated display device primarily designed for illuminating house numbers, street names or other alpha-numeric indicia intended to supply information.

SUMMARY OF THE INVENTION

A safety light for a disabled vehicle is provided which includes a translucent sign positioned within a frame, a light and suitable power supply for illuminating the sign, means to removably secure the frame to the vehicle and means to remove the frame from the vehicle, the translucent sign having a warning legend thereon in letters which are at least two (2) inches high and at least one-half (½) inch in thickness, such that, when the safety light is placed near the disabled vehicle and illuminated, the warning legend is visible from a distance of at least 65 feet.

Also provided are means for securing the safety light to the exterior surface of the disabled auto, and to the interior surface of the trunk lid of the auto. The power supply may be self-contained in the frame, i.e. batteries, or power may be obtained directly from the electrical circuitry of the vehicle through a suitable connecting cable.

BRIEF DESCRIPTION OF THE DRAWINGS

FIG. 4 shows one possible warning legend for the safety light.

DETAILED DESCRIPTION OF SPECIFIC EMBODIMENTS

Figure 1:
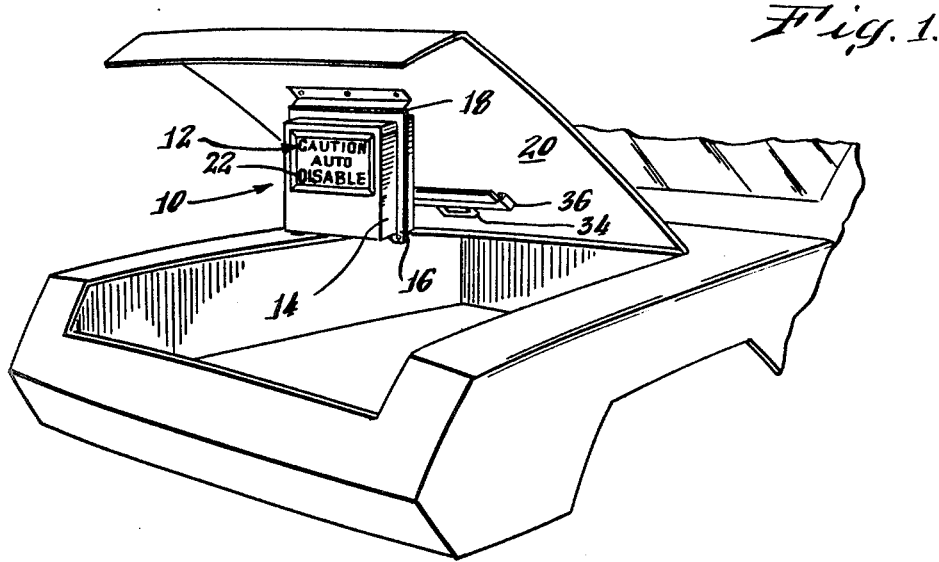
FIG. 1 is a perspective view of the vehicle safety light of this invention in position on the vehicle.
Figure 2:
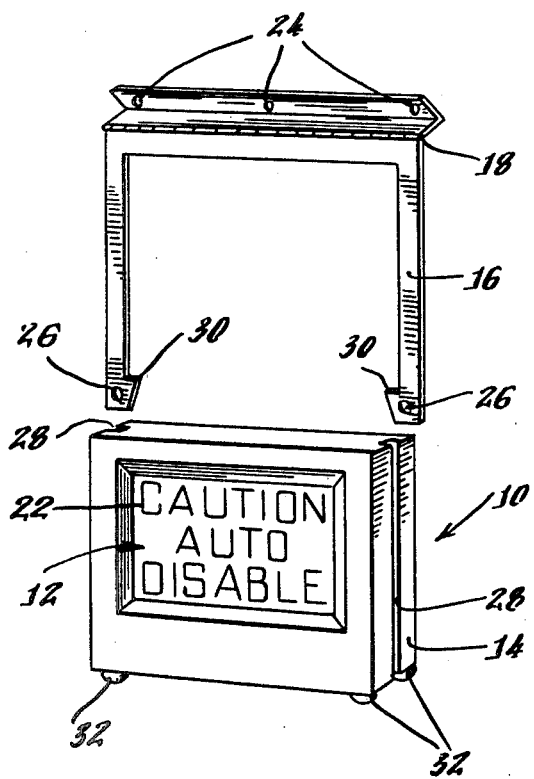
FIG. 2 is an exploded view of the vehicle light and the bracket to which it is secured.

Referring to the drawings, the safety light 10 includes a sign 12 and a frame 14. The light and power supply for the light (not shown) are located behind the sign 12 and within frame 14. Power may be supplied from self-contained batteries within the frame or the light may be connected to the electrical circuitry of the vehicle. The frame 14 is mounted on a bracket 16 which is attached to hinge 18 which, in turn, is secured to the inside surface of trunk lid 20. The hinge is provided with holes 24 through which screws can be threaded to attach the hinge 18 to the trunk lid 20.

The bracket 16 is provided with finger holes 26 so that the bracket 16 can be spread apart to remove safety light 10 from the bracket 16. The frame 14 is provided with slots 28 so that the frame 14 can be slid into bracket 16. The light 10 rests upon flanges 30 when in position in bracket 16. The safety light 14 is provided with suction cups 32 in the bottom surface of frame 14 so that the light 10 can be securely positioned on the outside surface of the automobile such as the roof, if desired.

Figure 3:
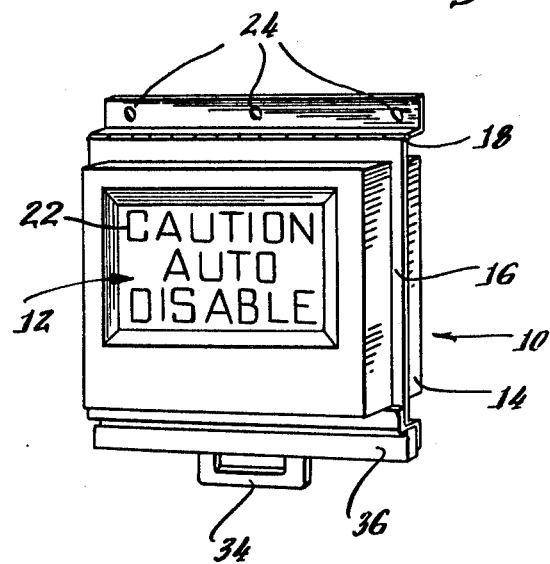
FIG. 3 is a front view of the vehicle light secured to the vehicle when not in use.

As shown in FIGS. 1 and 3, a pull handle 34 and spring-loaded latch 36 is secured to the interior surface of trunk lid 20. The latch 36 fits over the bottom portion of bracket 16 to secure the bracket 16 and light 10 in a closed position inside the automobile trunk.

It is critical to the invention herein that the size of the letters 22 shown on the illuminated face, for example in FIG. 4, be at least two (2) inches high and at least one-half (½) inch in letter thickness. These critical minimum dimensions are such that the warning legend of the safety light of this invention may be seen at a distance of sixty-five (65) feet away from the disabled vehicle. As published for example in the State of Delaware's Department of Public Safety "Driver's Manual", the distance travelled during the minimum perception and reaction time for an automobile travelling at 55 miles per hour, the legal maximum in most areas, is sixty (60) feet on dry pavement. Thus, an oncoming car approaching the disabled vehicle equipped with the device disclosed herein would have adequate warning and distance to react and avoid hitting the disabled vehicle. This is a key improvement in the device of this invention and is not disclosed in any known prior art.

It is to be understood that this invention is not limited to the specific embodiments shown but includes modifications which will be evident to the person skilled in the art.

I claim:

1. A safety light for a disabled automobile vehicle comprising a translucent sign positioned within a frame, a light and suitable power supply for illuminating said sign bracket, means to removably secure said frame to the interior surface of the trunk lid of said vehicle and means for removing said frame from said vehicle, means for securing said frame to an exterior surface of the vehicle when said frame is removed from said bracket, said translucent sign having a warning legend thereon in letters at least two (2) inches high and at least one-half (½) inch in thickness, whereby when said safety light is placed near said disabled vehicle and illuminated, the warning legend is visible from a distance of at least 65 feet.

2. The safety light of claim 1 wherein said power supply comprises batteries contained within said frame.

3. The safety light of claim 1 wherein said power supply comprises connections to the electrical circuitry of said vehicle.

* * * * *